United States Patent
Clemm et al.

(10) Patent No.: US 10,305,759 B2
(45) Date of Patent: May 28, 2019

(54) DISTRIBUTED AND ADAPTIVE COMPUTER NETWORK ANALYTICS

(71) Applicant: Cisco Technology, Inc., San Jose, CA (US)

(72) Inventors: Ludwig Alexander Clemm, Los Gatos, CA (US); Yegnanarayanan Chandramouli, Bangalore (IN); Saileshwar Krishnamurthy, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 419 days.

(21) Appl. No.: 14/589,953

(22) Filed: Jan. 5, 2015

(65) Prior Publication Data

US 2016/0197799 A1 Jul. 7, 2016

(51) Int. Cl.
*G06F 17/30* (2006.01)
*G06F 15/16* (2006.01)
(Continued)

(52) U.S. Cl.
CPC ............ *H04L 43/06* (2013.01); *H04L 41/046* (2013.01); *H04L 41/0803* (2013.01);
(Continued)

(58) Field of Classification Search
CPC . H04L 43/06; H04L 41/0803; H04L 41/0816; H04L 43/12; H04L 41/0886; H04L 67/10
(Continued)

(56) References Cited

U.S. PATENT DOCUMENTS

| 5,781,703 A | 7/1998 | Desai et al. |
| 7,984,043 B1 * | 7/2011 | Waas ................ G06F 17/30932 707/718 |

(Continued)

FOREIGN PATENT DOCUMENTS

| CA | 2444834 A1 | 4/2005 |
| WO | 2016053499 A1 | 4/2016 |
| WO | 2016111780 A1 | 7/2016 |

OTHER PUBLICATIONS

Baumann, "International Search Report and Written Opinion issued in International Application No. PCT/US2015/063748,", dated Mar. 18, 2016, 1-14.

(Continued)

*Primary Examiner* — Esther B. Henderson
*Assistant Examiner* — Golam Mahmud
(74) *Attorney, Agent, or Firm* — Johnson, Marcou & Issacs, LLC

(57) ABSTRACT

A network analytics controller in a computer network receives specification of a network analysis task. The controller creates maplets. Each maplet corresponds to an agent executing on a network node in the computer network. Each maplet specifies the network data collection configuration, collected data processing, and processed data reporting to be performed to support the network analysis task at the node executing the corresponding agent. The controller communicates the maplet corresponding to the agent over the computer network to each agent. Each agent receiving a maplet configures its corresponding network node for network data collection, collected data processing, and processed data reporting in accordance with the received maplet. Each agent receiving a maplet collects and processes network data, and reports the processed data to the controller, in accordance with the configuration. The controller (Continued)

aggregates, as the result of the network analysis task, the data reported from each agent.

17 Claims, 5 Drawing Sheets

(51) Int. Cl.
  *G06F 11/20* (2006.01)
  *H04L 12/26* (2006.01)
  *H04L 29/08* (2006.01)
  *H04L 12/24* (2006.01)

(52) U.S. Cl.
  CPC ...... *H04L 41/0816* (2013.01); *H04L 41/0886* (2013.01); *H04L 43/12* (2013.01); *H04L 67/10* (2013.01)

(58) Field of Classification Search
  USPC ......................................................... 709/202
  See application file for complete search history.

(56) References Cited

U.S. PATENT DOCUMENTS

| | | | |
|---|---|---|---|
| 8,117,175 B1* | 2/2012 | Johnson | G06F 17/30516 707/705 |
| 8,185,619 B1* | 5/2012 | Maiocco | H04L 12/6418 709/203 |
| 8,595,357 B2* | 11/2013 | Biswas | H04L 41/04 709/222 |
| 9,397,946 B1* | 7/2016 | Yadav | H04L 41/0806 |
| 9,559,896 B2* | 1/2017 | Patwardhan | H04L 41/0803 |
| 2002/0032769 A1* | 3/2002 | Barkai | G06Q 10/087 709/224 |
| 2003/0110252 A1* | 6/2003 | Yang-Huffman | H04L 41/0213 709/224 |
| 2003/0142666 A1* | 7/2003 | Bonney | H04L 43/045 370/389 |
| 2011/0246816 A1* | 10/2011 | Hsieh | G06F 17/30563 714/4.12 |
| 2011/0300848 A1* | 12/2011 | Boudreau | G01C 21/32 455/419 |
| 2011/0302164 A1* | 12/2011 | Krishnamurthy | G06F 17/30516 707/737 |
| 2012/0023498 A1* | 1/2012 | Sundararaman | H04L 47/621 718/102 |
| 2012/0179809 A1* | 7/2012 | Barsness | G06F 17/30516 709/224 |
| 2012/0297393 A1* | 11/2012 | Zhao | G06F 9/4843 718/102 |
| 2013/0163438 A1 | 6/2013 | Wilkinson et al. | |
| 2013/0275569 A1* | 10/2013 | Calo | H04W 4/00 709/223 |
| 2013/0290520 A1* | 10/2013 | Noo | H04L 41/147 709/224 |
| 2014/0047107 A1* | 2/2014 | Maturana | H04L 43/04 709/224 |
| 2014/0189130 A1 | 7/2014 | Khandelwal et al. | |
| 2014/0280338 A1* | 9/2014 | Metz | H04L 41/0853 707/774 |
| 2014/0324862 A1 | 10/2014 | Bingham et al. | |
| 2015/0089054 A1* | 3/2015 | Rizzi | H04L 43/045 709/224 |
| 2015/0149613 A1 | 5/2015 | Kakadia et al. | |
| 2016/0094420 A1 | 3/2016 | Clemm et al. | |
| 2016/0182982 A1* | 6/2016 | Schmidtke | H04L 45/38 398/51 |
| 2017/0060869 A1* | 3/2017 | Kelley | G06F 17/30864 |

OTHER PUBLICATIONS

Clemm, et al., "DNA: An SDN Framework for Distributed Network Analytics", 2015 IFIP/IEEE International Symposium on Integrated Network Management (IM), May 11, 2015 (May 11, 2015), pp. 9-17.
Clemm, "Network Analytics Task Interactions Framework", ip.com Journal, ip.com Inc., West Henrietta, NY, US, Feb. 20, 2015, XP013166591, Feb. 20, 2015, 1-8.
Jeswani, et al., "Adaptive Monitoring: Application of Probing to Adapt Passive Monitoring", Plenum Publishing Co, US, vol. 23, No. 4, Sep. 12, 2014, XP035533351, Sep. 12, 2014, 950-977.
Camba, "International Search Report and Written Opinion issued in International Application No. PCT/US2015/046426,", dated Nov. 13, 2015, pp. 1-13.
Dean, et al., "MapReduce: Simplified Data Processing on Large Clusters", Proceedings of the 6th Symposium on Operating Systems Design and Implementation, Dec. 6-8, 2004, San Francisco, CA, pp. 1-13.
Shah, "Office Action issued U.S. Appl. No. 14/550,885, filed Nov. 21, 2014,", dated Sep. 21, 2016, 16 pages.
Wittmann-Regis, "International Preliminary Report on Patentability issued in International Application No. PCT/US2015/046426,", dated Apr. 4, 2017, 9 pages.
Wittmann-Regis, "International Preliminary Report on Patentability issued in International Application No. PCT/US2015/063748,", dated Jul. 11, 2017, 8 pages.
U.S. Appl. No. 14/550,885 to Clemm et al., filed Nov. 21, 2014.
Shah, "Office Action issued U.S. Appl. No. 14/550,885, filed Nov. 21, 2014,", dated May 25, 2017, 30 pages.
Shah, "Final Office Action issued U.S. Appl. No. 14/550,885, filed Nov. 21, 2014,", dated Oct. 31, 2017, 29 pages.
Lupia, "EP Examination Report for EP application No. 15817002. 7", dated Oct. 5, 2018, 10 pages.
Shah, "Office Action in U.S. Appl. No. 14/550,885", dated Oct. 29, 2018, 17 pages.

* cited by examiner

DISTRIBUTED AND ADAPTIVE COMPUTER NETWORK ANALYTICS

TECHNICAL FIELD

The disclosed technology relates to computer network analytics. More specifically, the disclosed technology facilitates more efficient use of network resources through distributing network analytics tasks, and through making the distributed tasks adaptive to previously collected analytics data.

BACKGROUND

A computer network is a telecommunications network that allows computers to exchange data. Network devices that originate, route, and terminate the data are called network nodes. Network nodes can include hosts such as personal computers, phones, servers, as well as networking hardware. In computer networks, network nodes pass data to each other along data connections. Data is transferred typically in the form of packets. Connections between network nodes are established using various media, such as fiber optic cable, coaxial cable, and wireless links.

Computer network analytics can be used to monitor the performance of a network (for example quality of service, network congestion, and network resilience), monitor and enforce network security, provide visualizations of network operation, and support network configuration activities. Analytics applications that operate on data obtained from a network typically require the network to be configured to generate the necessary input data, in addition to aggregating that data and performing queries over that data. One aspect that typical computer network analytics applications have in common is that users need to decide beforehand which information to generate and which aggregation queries to perform. Typically, a user needs to initiate a separate query or analytics task and potentially reconfigure data sources to generate the data that is needed as a result.

DESCRIPTION OF EXAMPLE EMBODIMENTS

Overview

Figure 1:
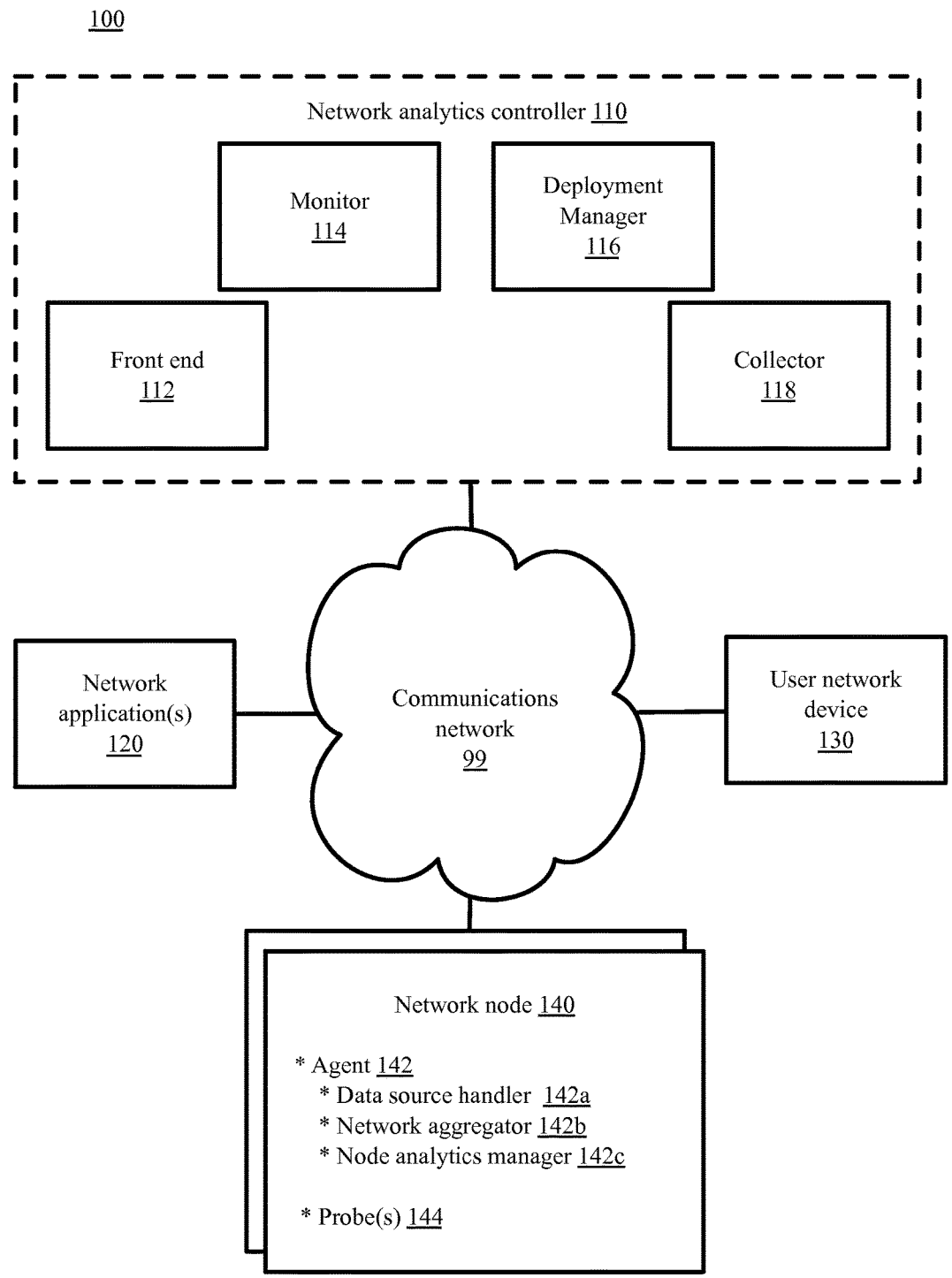
FIG. 1 is a block diagram depicting a computer network in accordance with certain example embodiments of the disclosed technology.

Embodiments of the technology disclosed herein include a distributed system that can facilitate distributed and adaptive computer network analytics by decomposing a network analytics task into multiple subtasks, which are deployed across the network and performed on network nodes.

In certain example embodiments of the disclosed technology, a network analytics controller in a computer network receives a specification of a network analysis task. The network analytics controller creates a plurality of "maplets." Each maplet corresponds to an agent executing on a particular network node in the computer network. Each maplet specifies network data collection configuration, collected data processing, and processed data reporting to be performed at the particular network node executing the corresponding agent to support the specified network analysis task. The network analytics controller communicates the maplet corresponding to each corresponding agent over the computer network.

Each agent receiving a maplet configures its corresponding network node for network data collection, collected data processing, and processed data reporting in accordance with the maplet received by the agent. Each agent collects network data and processes the collected data in accordance with the configuration. Each agent reports, to the network analytics controller, its processed data in accordance with the configuration. The network analytics controller aggregates the data reported as the result of the specified network analysis task.

In certain embodiments, the disclosed technology can adapt the analytics task based on the analytics results obtained thus far, without requiring further user intervention. Adapting a computer network analytics task can involve adapting the query as well as the configuration of underlying data sources feeding into the query process. Generally, it is inefficient to do the trivial step of collecting all the measurements all the time. Since the user typically does not know what he is looking for beforehand, collecting all the measurements all the time is a waste of network resources. Instead, data generation and collection of the right measurements at the right granularity can be dynamically adjusted.

Embodiments of the present technology include an adaptive refinement of the analytics task and the configuration of the corresponding input data sources, which are components of the network query functionality for distributed and adaptive network analytics. Some embodiments involve a maplet containing a configuration of data sources, not just a conditional evaluation of an expression, and include a framework to monitor and log the execution of child maplets. In some embodiments, query based network analytics includes the dynamic configuration of data sources to generate data when and only when it is actually needed, without incurring any substantial loss of analytics fidelity. Without this functionality, data sources can be activated on an as-needed basis, and not turned on all the time. Leaving one or more data sources turned on all the time waste system resources. Adaptive query refinement can be implemented as part of distributed network analytics. Some of the use cases, such as network brownouts, involve multiple data sources, and adapting query parameters in such use cases improves the value and efficiency of network analysis. The concept of applying and triggering new data sources based on results in the original query is useful. The chaining of such concepts can provide a mechanism to adaptively refine the query and collect more granular data from other sources in an automated manner.

Example Architectures

In example architectures for the technology, while certain servers, systems, and devices shown in the architecture are represented by one instance of the server, system, or device, multiple instances of each can be used. Further, while certain aspects of operation of the present technology are presented in examples related to the figures to facilitate enablement of the claimed invention, additional features of the present technology, also facilitating enablement of the claimed invention, are disclosed elsewhere herein.

As depicted in FIG. 1, a system 100 for distributed and adaptive computer network analytics includes network computing devices, such as a network analytics controller 110, network applications 120, user network device(s) 130, and other network nodes 140; each of which may be configured to communicate with one another via communications network 99. In some embodiments, a user associated with a device must install an application and/or make a feature selection to obtain the benefits of the technology described herein. In some embodiments, a network node 140 can be a) a host, such as, but not limited to, a personal computer, phone, or server, or b) networking hardware, such as, but not limited to, a gateway, a routers, a network bridge, a switch, a hub, or a repeater.

Communications network 99 includes one or more wired or wireless telecommunications means by which the network computing devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device can include a communication module capable of transmitting and receiving data over the communications network 99. For example, each network device can comprise a server, a desktop computer, a laptop computer, a tablet computer, a television with one or more processors embedded therein and/or coupled thereto, a smart phone, a handheld computer, a personal digital assistant (PDA), or any other wired or wireless processor-driven device.

The network connections illustrated are example and other means of establishing communications between the computers and devices can be used. Additionally, those having ordinary skill in the art and having the benefit of the present disclosure will appreciate that the network devices illustrated in FIG. 1 may have any of several other suitable computer system configurations. For example, a user network device 130 embodied as a mobile phone or handheld computer may not include all the components described above.

Figure 5:
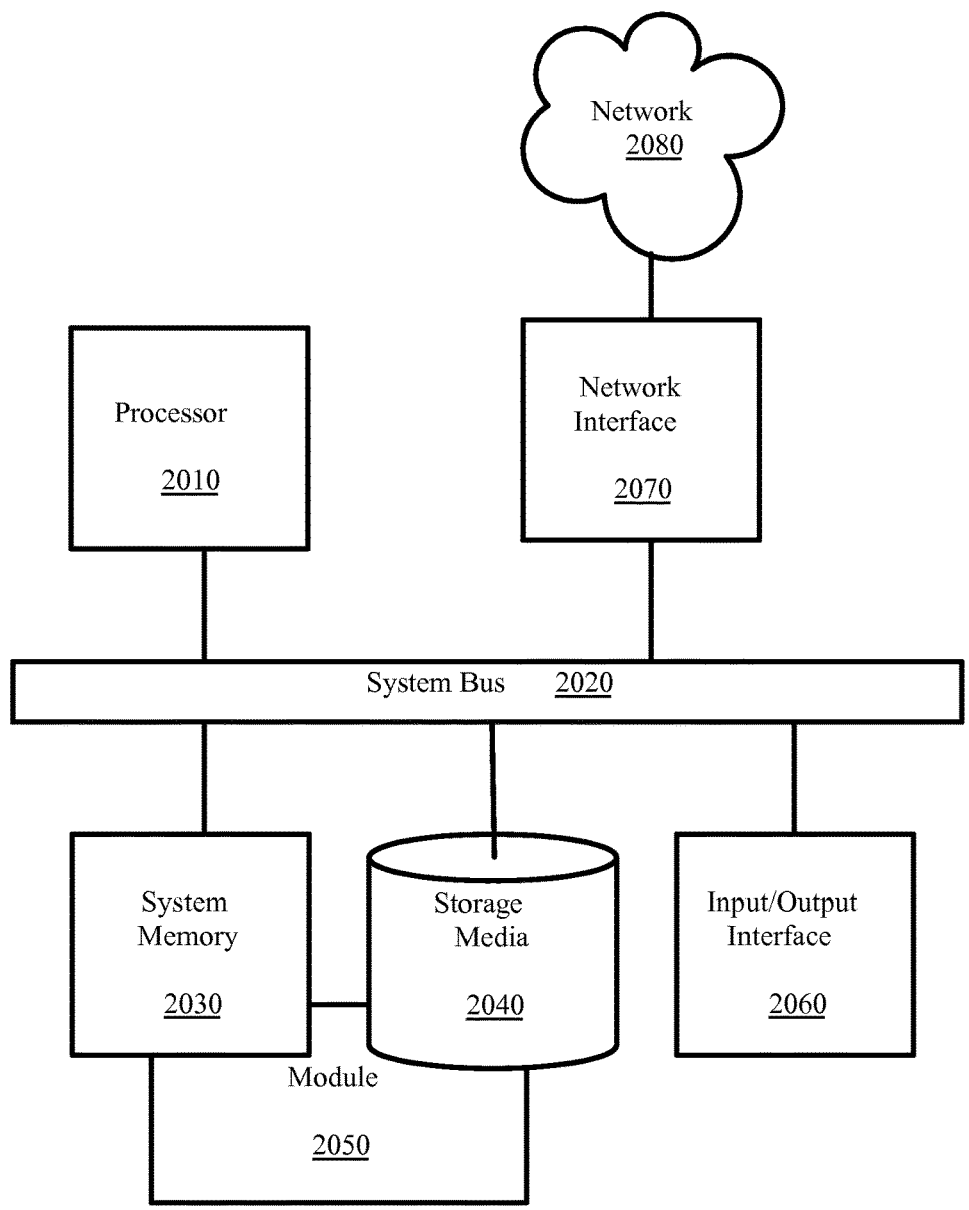
FIG. 5 is a block diagram depicting a computing machine and a module, in accordance with certain example embodiments.

In example embodiments, the network devices, and any other computing machines associated with the technology presented herein, may be any type of computing machine such as, but not limited to, those discussed in more detail with respect to FIG. 5. Furthermore, any modules associated with any of these computing machines, such as modules described herein or any other modules (scripts, web content, software, firmware, or hardware) associated with the technology presented herein may by any of the modules discussed in more detail with respect to FIG. 5. The computing machines discussed herein may communicate with one another as well as other computer machines or communication systems over one or more networks, such as communications network 99. The communications network 99 may include any type of data or communications network, including any of the network technology discussed with respect to FIG. 5.

The example embodiments illustrated in the following figures are described hereinafter with respect to the components of the example operating environment and example architecture described elsewhere herein. The example embodiments may also be practiced with other systems and in other environments.

In the example embodiments of FIG. 1, a network analytics controller 110 can control a network analytics service. The network analytics controller 110 can include the components or modules described hereinafter. A front end 112 exposes an interface that allows users (for example, via user network devices 130) and higher protocol layer network applications 120 to configure basic parameters (for example, data source, schedule, analytics functions, or tasks to be performed) for distributed analytics processing.

A network analytics monitor 114 provides a monitoring function that logs which network nodes 140 participate in a given analytics function, a health status of analytics tasks, and statistics about each task, among other items. Users can retrieve such information, or be notified as appropriate, to get a sense of the level of degradation of a task (for example, in case of nodes in the network with degraded capabilities, inability to support the requested query, etc.).

A network analytics deployment manager 116 determines network analytics tasks to be performed by one or more node analytics agents 142 deployed at network nodes 140, generates one or more maplets, deploys those maplets to agents 142 across the network, and resolves where to deploy the network analytics tasks, and how to deal with the impact of network changes (for example, when a new node joins the network, deploying a task that is already ongoing in the network for other network nodes 140).

A network analytics results collector 118 collects the results. The collector 118 can collate those results for network analytics across network nodes 140 or network level cross-correlation. For this purpose, results can be fed as a data stream into an instance of a stream processing engine that also runs at a network analytics controller 110. The processing to be conducted can be specified as part of a "reducelet" that defines the fields of the data stream and the query and aggregations to be applied. In some embodiments, the network analytics controller 110 can be implemented on top of a Software Defined Network (SDN) that allows network administrators to manage network services through abstraction of lower-level functionality by decoupling the control plane from the data plane. For example, a model constructed in a network configuration modeling language, such as a YANG Data Model, can be defined to describe network analytics tasks that can be configured by users. A network analytics task can include a network scope (indicating across which part of the network a task is to be applied), a maplet (indicating the data sources for the task, and the query and aggregation to be applied against the data), and a schedule. Using a YANG data model, a REpresentational State Transfer (REST) API can be generated and exposed by the network analytics controller 110 to users. A REST API, for example, as implemented using RESTCONF, provides a programmatic interface over HyperText Transfer Protocol (HTTP) for accessing data defined in the YANG data model.

A node analytics agent 142 can be deployed at network nodes 140 to be analyzed. Each agent 142 can include a data source handler 142a, a network aggregator 142b, and a node analytics manager 142c. The data source handler 142a can configure telemetry data sources, such as probes 144, as needed to generate the data that will be aggregated, and thus can configure the appropriate telemetry data source, such as Simple Network Management Protocol (SNMP), or IP Service Level Agreements (IPSLA), for service level monitoring. The network aggregator 142b can execute both query and aggregation function logic that preprocesses raw data and forwards the aggregated data to the network analytics controller 110. One example includes continuous queries, such as used in a Continuous Query Engine (CQE). The node analytics manager 142c can communicate with the network analytics controller 110 for discovery, registration, and deployment of aggregation analytics tasks, and for conducting analytics admission functions (deciding whether to accept or decline task requests based on current load conditions) and systems management functions (including automatic release of resources after conclusion of the task or when a task is not refreshed.)

Embodiments of the present technology include methods, systems, and logic (encoded on one or more tangible media for execution) for network data analytics that allow for adaptive refinement of data generation and analytics queries as specified in one or more maplets. Such embodiments allow parameters of the query to be automatically adjusted and sub-queries to be performed when a trigger condition is detected. The automatic adjustment can include the reconfiguration of required data sources and spawning of network analytic tasks for the new data sources as needed.

One use of such a system involves applying an initial query that performs lightweight analytics on coarse-grained network telemetry data, for example, an exploratory analytics step that can consume minimal network resources. When a particular trigger condition is detected, suitable child maplets chained to one or more initial maplets are automatically launched along with any needed adjustment to data sources and measurement collection of the original maplets. The sub-queries are terminated and data collection reverted (for example, these expensive network tasks are run only for a finite amount of time) when the condition of the initial query is no longer met or a "hysteresis" condition is detected.

In some embodiments, the query refinement can be restricted to a smaller subset of network nodes 140 based on the first query. For example, the first query can be to discover the network nodes 140 along a path or service, or the network nodes 140 that meet a condition. The second query is chained to the results of the first query to obtain the performance metrics along that path. Obtaining such performance metrics involve configuring new measurements of link performance (for example, packet discards, queue depth) for the links along that path. Another example is that the granularity of measurement collection and aggregation can be tuned dynamically, based on the detection of specific events; either resorting to coarser grained measurements or more fine grained measurements, including changing the parameters of the data source or the aggregation parameters of the query.

Certain embodiments of the technology define an analytics task as a set of chained maplets, which are interpreted by an embedded analytics engine (such as an agent 142). A maplet is an analytics task that can be performed by an agent 142 on a network node 140, which contains the definition of a set of source data and an express or implied configuration of the data source, as well as an analytics query. The maplet can be augmented with the ability to chain another maplet that is used to refine the analytics task, here referred to as a refinement maplet. In some embodiments, a condition for the other maplet can be defined. The chaining can specify one or more of the following.

A) A refinement maplet, which can be defined inline (as part of the definition of the instantiating maplet) or whose definition can be referenced to other maplets.

B) A trigger that is used to spawn a refinement maplet ("child"). A sample trigger is when a match to the analytics query of the triggering maplet is detected. One example is the crossing of a threshold, which triggers another more refined analytics query.

C) A revocation trigger, causing a refinement maplet ("child") to be terminated. A revocation trigger can be, for example, the absence of a match to the analytics query of the triggering maplet for a specified time period, or a second trigger. One example would be the crossing of a hysteresis threshold, which terminates the more refined analytics query.

In certain example embodiments, maplets can be chained, with each step in the chain refining the analytics of the triggering maplet. Likewise, several maplets can be chained to the same triggering maplet, each associated with its own trigger. In some embodiments, the termination of a maplet terminates all its refinement maplets. Further, a trigger can include a set of several trigger conditions. When a refinement maplet is triggered, the triggering maplet continues to execute (subject to other conditions of its termination). The operational state of a maplet is extended to indicate whether refinement maplets are currently being executed.

Example Processes

Figure 2:
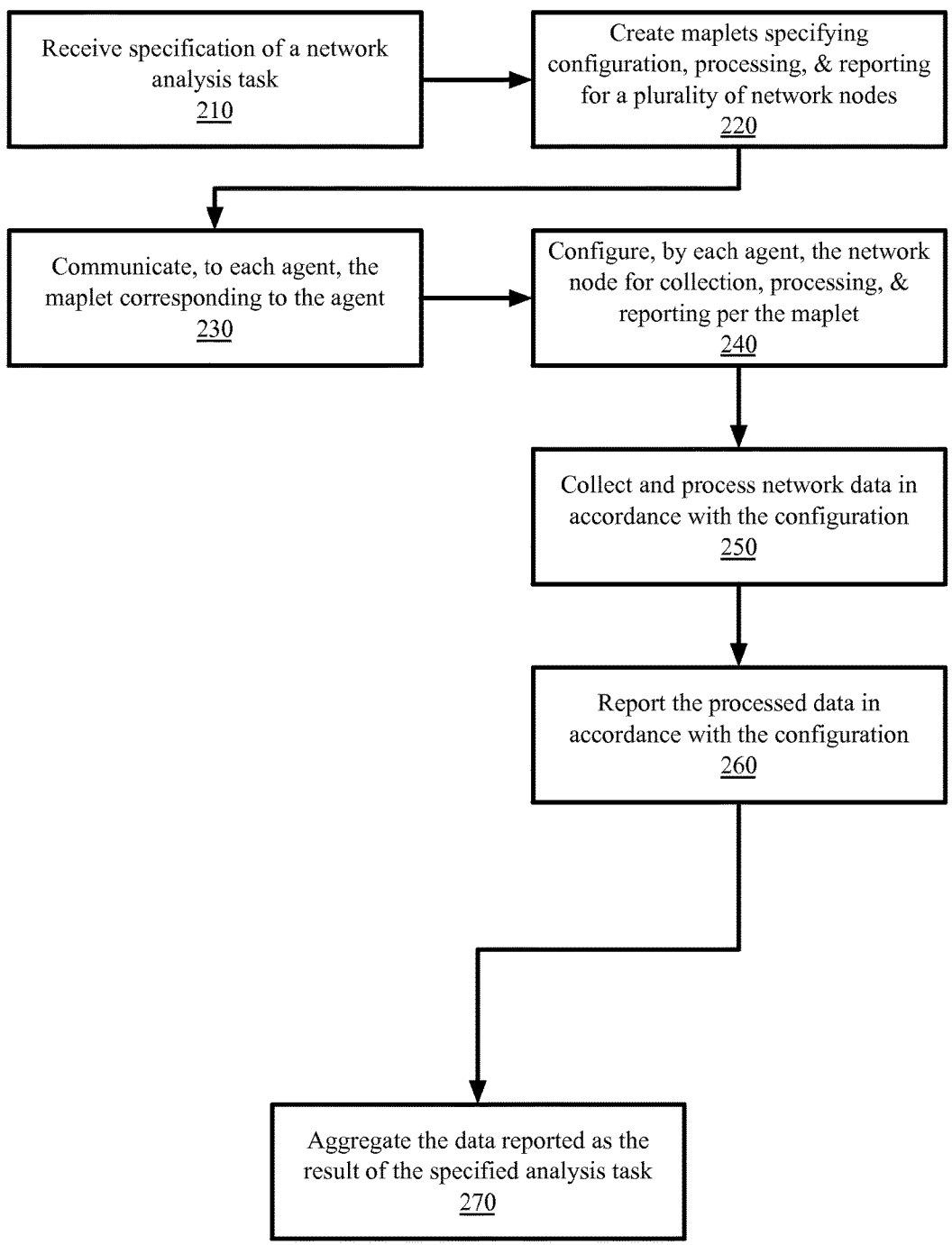
FIG. 2 is a block flow diagram illustrating methods for computer network analytics in accordance with certain example embodiments.

Referring to FIG. 2, and continuing to refer to FIG. 1 for context, a block flow diagram illustrating methods 200 for computer network analytics in accordance with certain example embodiments is shown. In such embodiments, a network analytics controller 110 in a computer network receives a specification of a network analysis task—Block 210. As a continuing example, consider a task to monitor link utilization across a plurality of network nodes 140 over 10-minute intervals. The task can be received by a network analytics controller 110 front end 112 from a user via a graphical user interface operating in a web browser on user network device 130. In other examples, specification of the task can be received from a network application 120.

The network analytics controller 110 creates a plurality of maplets to implement the specified task—Block 220. Each maplet can correspond to a particular agent 142 executing on a particular network node 140 in the computer network. Each maplet can specify the data collection configuration, processing to be performed on the collected data, and reporting to be done on the processed data at the particular network node 140 executing the corresponding agent 142.

In the continuing example, the technology can create a plurality of maplets to monitor link utilization on one or more ports of each of a plurality of network nodes 140. To specify the data collection configuration, each maplet calls for monitoring the number of bits of unicast traffic received over certain ports, the number of bits of transmitted traffic of any type received (both multi-cast and broadcast) over each port, and the number of bits of traffic received in error packets over each port on the network node 140.

To specify processing to be performed, each maplet specifies determining the utilization percentage for 1) unicast received and all transmitted traffic of any type as % URxAllTx=(# URxAll Tx bits×100)/(port bandwidth×10 min. interval); 2) all multicast and broadcast traffic received % NURx=(# NURx bits×100)/(port bandwidth×10 min. interval); and all error packets received % ErrRx=(# ErrRx bits×100)/(port bandwidth×10 min. interval). Specified data reporting includes reporting based on a hysteresis threshold of 75% utilization (increasing)–70% utilization (decreasing) for the busiest of 1), 2), or 3) on the port. An example time scale at which URxAll Tx, NURx measurements can be polled is every 1 minute and for a duration of 10 minutes; resulting in 10 samples to determine the average utilization.

While in the continuing example, each maplet is the same (other than, for example, for specifying certain ports on the network node 140 where the maplet is to be deployed), maplets can be created to be network node-specific. For example, at some network nodes 140, the URxAll Tx, NURx measurements can be polled at finer granularity, for example, on a 30 second timescale.

The network analytics controller 110 communicates each created maplet corresponding to a particular agent over the communications network 99 to each particular agent 142 executing on a particular network node 140 in the system 100—Block 230. In the continuing example, each maplet is communicated to agents 142 executing on both hosts and networking hardware in the system 100.

Each agent 142 receiving a maplet configures the particular network node 140 on which it resides, using the data source handler 142a, based on the maplet instructions, for data collection, collected data processing (for example, analytic query specification, or the calculations to be performed on the data), and processed data reporting in accordance with the maplet received by the particular agent 142—Block 240. The specific configuration of a network node 140 by the agent 142 according to a maplet depends on the specific commands included in the maplet. Maplet commands for data collection, collected data processing, and processed data reporting include commands such as 1) Connectivity Fault Management (CFM) commands for continuity check, link trace, loop-back, fault verification, and fault isolation; and 2) performance monitoring commands for measurement of frame delay, frame delay variation, frame loss, and frame throughput. The agent 142 reads each command from the maplet along with conditions on the command, opens a control plane interface to the network node 140 using the data source handler 142a, and writes the command as specified by the maplet. In the continuing example, a data source handler 142a, after reading a command from the maplet, turns on/resets port counters at the ports specified by the maplet at each network node 140 executing an agent 142 that has received a maplet in order to monitor traffic through an interface of the network node 140, and schedules a "show port" command to retrieve the collected data at the intervals specified by the maplet.

Network data can be collected in accordance with the configured network node 140, and the collected data can be processed by the agent 142 receiving the maplet—Block 250. The network node 140 collects network data by execution of the configured commands for CFM and performance monitoring. In the continuing example, the network node 140 collects the number of URxAllTx, NURx, and ErrRx bits across the 10 minute time interval—such as by using the configured "show port" command as described in connection with Block 250 for retrieving the count of corresponding packets through the specified port(s). The network aggregator 142b processes the collected data; in the instant example by multiplying by the number of bits per packet. The network aggregator 142b then determines % URxAllTx, % NURx, and % ErrRx as defined above at 1), 2), and 3).

The network aggregator 142b and the node analytics manager 142c of the agent 142 can report the processed data in accordance with the configuration of the agent 142 that collected and processed the data—Block 260. In the continuing example, according to the hysteresis threshold, if any of % URxAllTx, % NURx, and % ErrRx crosses 75% utilization increasing or 70% utilization decreasing as determined by the network aggregator 142b, the node analytics manager 142c makes a report to the network analytics controller 110. The node analytics manager 142c reports to the network analytics controller 110 using a protocol such as Internet Control Message Protocol (ICMP), which is intended for passing control plane data for network diagnostic and control purposes. In some embodiments, datagram protocols at other layers, such as Stream Control Transmission Protocol (SCTP), are used, for example when a network node 140 is not equipped to report via ICMP.

The reported data from each configured network node 140 can be aggregated at the network analytics controller 110— Block 270. The network analytics controller 110 receives reports from each network node 140 at which an agent 142 is executing according to a maplet, and then performs processing in accordance with the specification of the original network analysis task received as described in conjunction with Block 210. In the continuing example, the state of each network node 140 executing an agent 142 is logged as "normal" (threshold not currently exceeded) or "high" (threshold currently exceeded). The percentage of network nodes 140 operating in the high state is the aggregated data.

Figure 3:
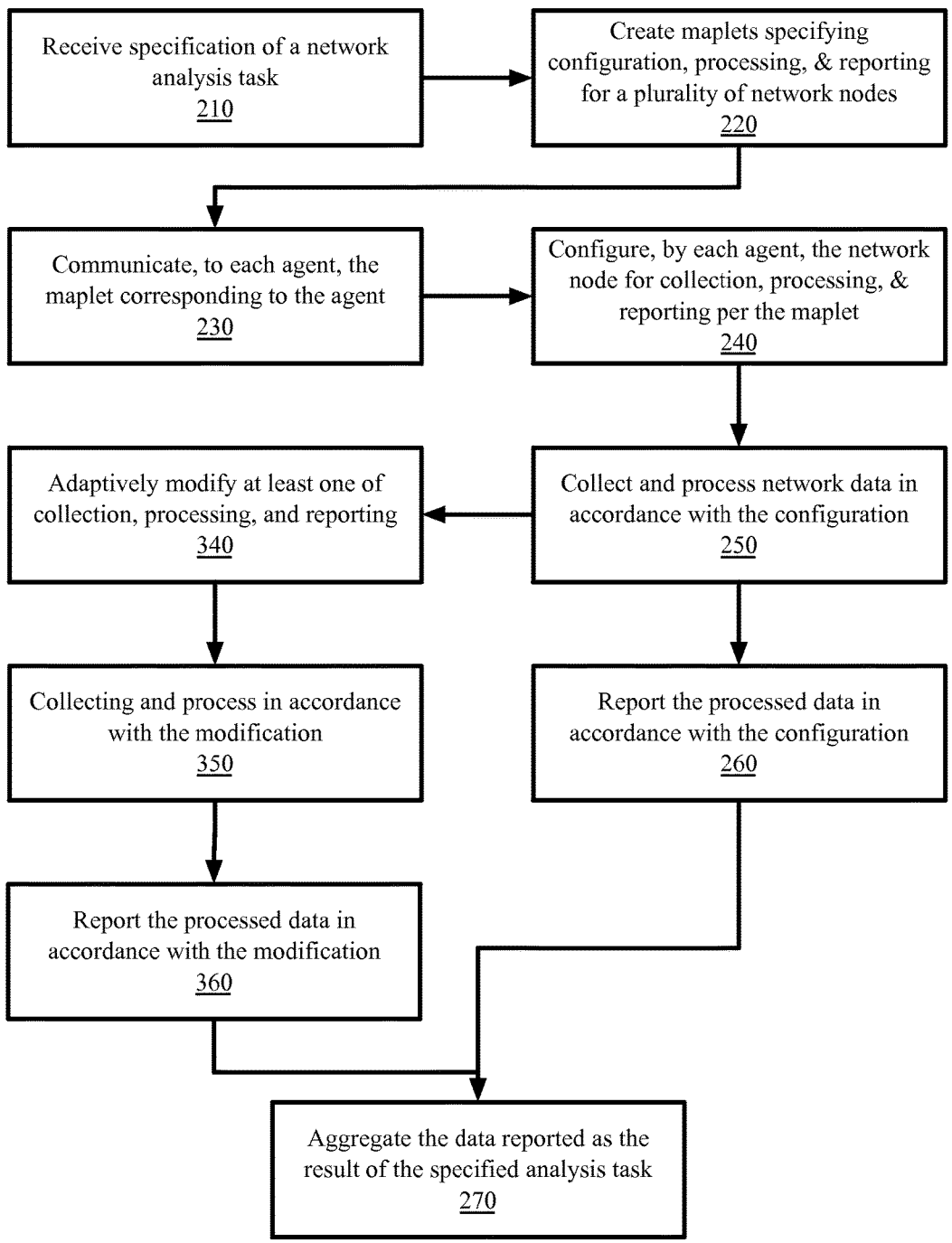
FIG. 3 is a block flow diagram illustrating methods for computer network analytics in accordance with certain alternative example embodiments.

Referring to FIG. 3, and continuing to refer to prior figures for context, a block flow diagram illustrating methods 300 for computer network analytics in accordance with certain alternative example embodiments is shown. In such methods, blocks 210-270 are performed as described above in connection with FIG. 2. In the methods of FIG. 3, at least one of a) the network data collection configuration, b) the collected data processing, and c) the processed data reporting specified by at least one maplet is adaptive to the network data previously collected in accordance with the configuration of at least one maplet.

After collecting data in accordance with at least one maplet, at least one of a) the network data collection, b) collected data processing, and c) processed data reporting of at least one maplet is adaptively modified in accordance with the original maplet—Block 340. At the network node 140 level, the node analytics manager 142c reads the maplet previously sent to the network node 140 to determine conditions under which the maplet should be adapted (including spawning one or more child maplets), and the nature of the adaptation should the conditions be satisfied. The node analytics manager 142c tests the conditions using the data collected at the network node 140. Upon a condition being satisfied, the agent 142 modifies data sources based on the nature of the adaptation specified in the original maplet, and continues reporting as described above.

In a first variation of the continuing example, the original maplet is adaptive, by rules in its specification, to reconfigure the network node 140 associated with the agent 142 receiving the original maplet if the utilization threshold is exceeded, that is, if the state of the network node 140 is "high" utilization. In the first variation, the initially collected and processed data indicates "high" utilization for the network node 140 in question, and the original maplet spawns a child maplet that causes the agent 142 to configure the network node 140 to collect data on packet drops and queue depth at five (5) second intervals, and process the collected data by determining a running average of packet drops and queue depth across a one (1) minute moving window.

Continuing to refer to FIG. 3, network data is collected and processed according to the modification—Block 350.

The processing of Block 350 is performed as described in conjunction with Block 250, but this time giving the one (1) minute moving average of packet drops and queue depth. In the first variation of the continuing example, data on packet drops and queue depth is collected at five (5) second intervals, and the collected data is processed by determining a running average of packet drops and queue depth across a one (1) minute moving window as per the specification of the child maplet.

The data processed in accordance with the modification is reported in accordance with the modification—Block 360. The reporting of Block 360 is performed as described in conjunction with Block 260. In the first variation of the continuing example, the one (1) minute moving average number of packet drops and the one (1) minute moving average queue depth is reported by the agent 142 to the networks analytics controller 110.

In some example embodiments, at the network analytics controller 110 level, results reported from a first network node 140 can prompt the network analytics controller 110 to either report the results to an agent at one or more additional network nodes 140 for the agent 142 at each node to adapt the configuration of the network node 140, or revise and retransmit one or more maplets (including child maplets) to one or more other network nodes 140. The particular network nodes 140, to which the adaptation is communicated, are determined by the network analytics controller 110 in accordance with the network analytics task specification described in conjunction with Block 210. In such embodiments, the maplet that is adapted is a maplet of the one or more other network nodes 140, and the adaptation/modification takes place after the processed data of the first maplet has been reported, for example to the network analytics controller 110.

In a another variation of the continuing example, the initial report of one network node 140 in a "high" utilization state prompts the network analytics controller 110 to communicate that state to agents 142 at other network nodes 140, which prompts the other agents 142 to adapt a maplet that causes each other agent 142 to configure its network node 140 to collect data on packet drops and queue depth at ten (10) second intervals, process the collected data by determining a running average of packet drops and queue depth across a one (1) minute moving window, and report the processed data to the network analytics controller 110.

Figure 4:
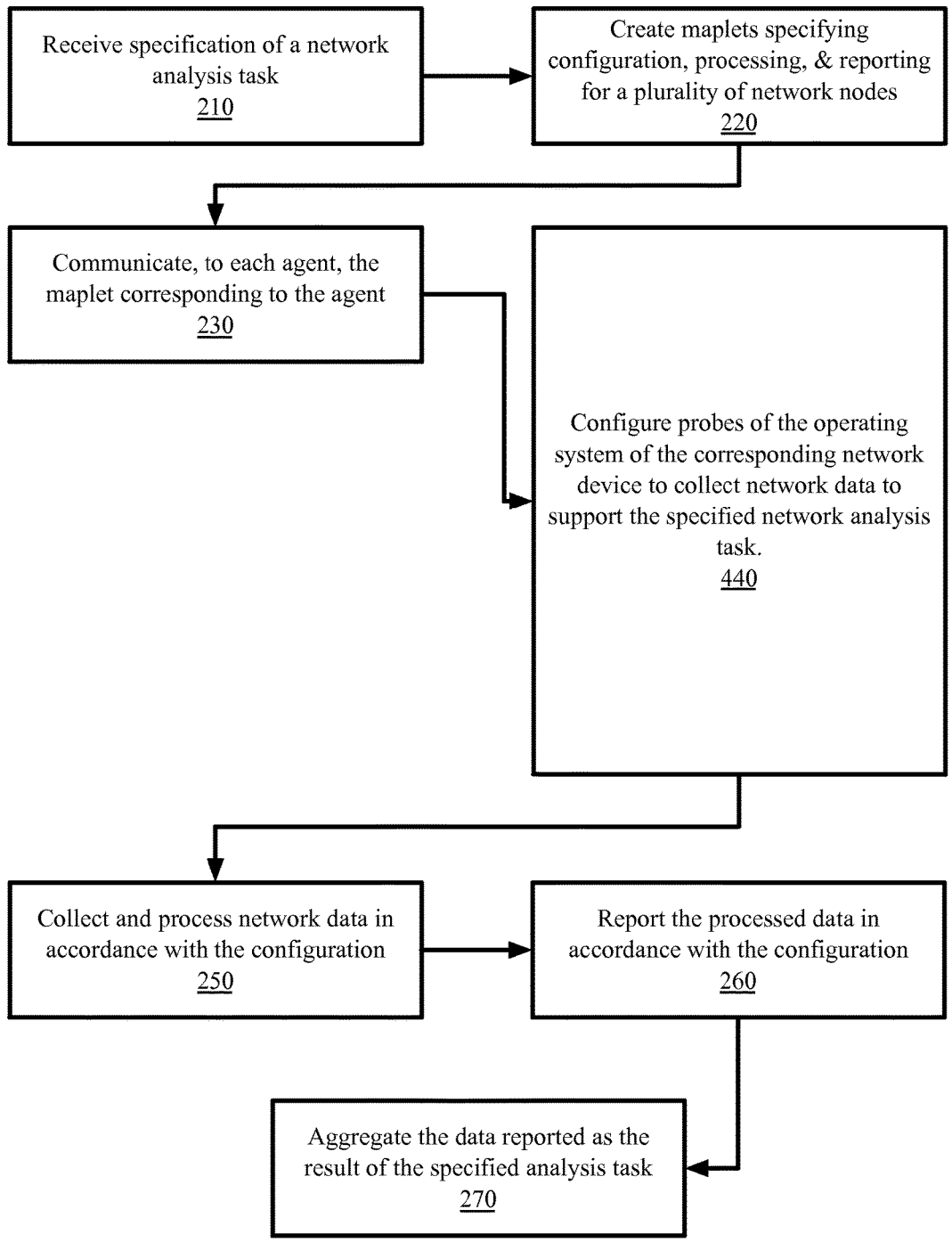
FIG. 4 is a block flow diagram illustrating methods for computer network analytics in accordance with certain alternative example embodiments.

Referring to FIG. 4, and continuing to refer to prior figures for context, a block flow diagram illustrating methods 400 for computer network analytics in accordance with certain alternative example embodiments is shown. Blocks 210-230 and 250-270 are performed individually as described above in connection with FIG. 2. However, block 440 is performed between blocks 230 and 250. In such methods, configuring network data collection and collected data processing can include configuring probes 144 of the operating system of the corresponding network node 140 to collect network data to support the specified network analysis task—Block 440.

As an example, the agent 142 can configure probes 144 using the network node's 140 operating system interface to collect data in accordance with the corresponding maplet. For example, a maplet can contain commands, such as probe 144 configuration commands, which the agent 142 extracts from the maplet and executes by entering the probe 144 submode in the control plane of the network node 140 on which the agent 142 resides. Probe 144 configuration commands specify probe name, probe type (such as HTTP), and characteristics such as the data collection interval, the number of retries that are allowed before making the network node 140 as failed, and the number of consecutive valid responses that are required before marking a network node 140 as healthy.

As another example, consider an agent 142 at a first network node 140 that has configured probes 144 to discover the nodes along a path from the first network node 140 to a second network node 140. The maplet implemented by the agent 142 at the first node calls for the agent 142 to configure the node 140 to collect performance metrics along the discovered path.

Other Example Embodiments

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended block flow diagrams and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A method, comprising:
   receiving, by a network analytics controller in a computer network, a specification of a network analysis task;
   creating, by the network analytics controller, a plurality of maplets, each maplet:
      corresponding to an agent executing on a particular network node in the computer network, and
      specifying network data collection configuration, collected data processing, and processed data reporting to be performed to support the specified network analysis task at the particular network node executing the corresponding agent;
   communicating, by the network analytics controller over the computer network to each agent executing on a particular network node, the maplet corresponding to the agent;
   configuring, by each agent receiving a communicated maplet, the network node corresponding to the agent receiving the maplet for network data collection, collected data processing, and processed data reporting in accordance with the maplet received by the agent;
   collecting network data and processing the collected network data, by each agent receiving a maplet, in accordance with the configuration;
   reporting, to the network analytics controller, by each agent receiving a maplet, the processed data in accordance with the configuration, wherein at least one of the network data collection configuration, collected data processing, and processed data reporting specified by a first maplet is adaptive to the processed data reported in accordance with a second maplet;
   modifying, by a first agent corresponding to the first maplet, the configuration of the node corresponding to the first agent for at least one of the network data collection, the collected data processing, and the processed data reporting, in adaptation to the processed data reported in accordance with the second maplet; and
   aggregating, by the network analytics controller, the data reported from each agent receiving a maplet, as a result of the specified network analysis task.

2. The method of claim 1, wherein the first maplet and the second maplet are the same maplet.

3. The method of claim 1, wherein the first maplet and the second maplet are different maplets.

4. The method of claim 1, wherein configuring network data collection and collected data processing comprises configuring probes of the operating system of the corresponding network node to collect network data to support the specified network analysis task.

5. Logic encoded on one or more non-transitory tangible media for execution and when executed operable to:
   receive a specification of a network analysis task in a computer network;
   create a plurality of maplets, each maplet:
      corresponding to an agent executing on a particular network node in the computer network, and
      each maplet specifying network data collection configuration, collected data processing, and processed data reporting to be performed to support the specified network analysis task at the particular network node executing the corresponding agent;
   communicate, over the computer network to each agent executing on a particular network node, the maplet corresponding to the agent;
   configure, by each agent receiving a communicated maplet, the network node corresponding to the agent receiving the maplet for network data collection, collected data processing, and processed data reporting in accordance with the maplet received by the agent;
   collect network data and process the collected network data, by each agent receiving a maplet, in accordance with the configuration;
   report, to a network analytics controller, by each agent receiving a maplet, the processed data in accordance with the configuration, wherein at least one of the network data collection configuration, collected data processing, and processed data reporting specified by a first maplet is adaptive to the processed data reported in accordance with a second maplet;
   modify, by a first agent corresponding to the first maplet, the configuration of the node corresponding to the first agent for at least one of the network data collection, the collected data processing, and the processed data reporting, in adaptation to the processed data reported in accordance with the second maplet; and
   aggregate, by the network analytics controller, the data reported from each agent receiving a maplet, as the result of the specified network analysis task.

6. The logic of claim 5, wherein the first maplet and the second maplet are the same maplet.

7. The logic of claim 6, wherein the first maplet and the second maplet are different maplets.

8. The logic of claim 5, wherein configuring network data collection and collected data processing comprises configuring probes of the operating system of the corresponding network node to collect network data to support the specified network analysis task.

9. A system, comprising:
a storage device; and
a processor communicatively coupled to the storage device, wherein the processor executes application code instructions that are stored in the storage device to cause the system to:
receive a specification of a network analysis task in a computer network;
create a plurality of maplets, each maplet:
corresponding to an agent executing on a particular network node in the computer network; and
specifying network data collection configuration, collected data processing, and processed data reporting to be performed to support the specified network analysis task at the particular network node executing the corresponding agent;
communicate, over the computer network to each particular executing on a particular network node, the maplet corresponding to the particular;
configure, by each agent receiving a communicated maplet, the network node corresponding to the agent receiving the maplet for network data collection, collected data processing, and processed data reporting in accordance with the maplet received by the agent;
collect network data and process the collected network data, by each agent receiving a maplet, in accordance with the configuration;
report, to a network analytics controller, by each agent receiving a maplet, the processed data in accordance with the configuration, wherein at least one of the network data collection configuration, collected data processing, and processed data reporting specified by a first maplet is adaptive to the processed data reported in accordance with a second maplet;
modify, by a first agent corresponding to the first maplet, the configuration of the node corresponding to the first agent for at least one of the network data collection, the collected data processing, and the processed data reporting, in adaptation to the processed data reported in accordance with the second maplet; and aggregate, by the network analytics controller, the data reported from each agent receiving a maplet, as the result of the specified network analysis task.

10. The system of claim 9, wherein the first maplet and the second maplet are the same maplet.

11. The system of claim 10, wherein the first maplet and the second maplet are different maplets.

12. The system of claim 9, wherein configuring network data collection and collected data processing comprises configuring probes of the operating system of the corresponding network node to collect network data to support the specified network analysis task.

13. The system of claim 9 wherein:
the application code instructions that cause the system to receive a specification of a network analysis task, create a plurality of maplets to support the specified task, communicate each maplet to a particular, and aggregate the data reported from each agent, are executed by a network analytics controller; and
the application code instructions that cause the system to receive the maplet corresponding to a particular, configure a network node corresponding to the particular agent in accordance with the received maplet, collect network data in accordance with the configuration, process the collected network data in accordance with the configuration, and report the processed network data in accordance with the configuration, are performed at the network node executing the particular.

14. The system of claim 13:
wherein at least one of the network data collection configuration, collected data processing, and processed data reporting specified by a first maplet is adaptive to the processed data reported in accordance with a second maplet, and
wherein the logic, when executed, is further operable to adapt at least one of the network data collection, collected data processing, and processed data reporting at the network node of the first maplet to and the processed data reported in accordance with the second maplet.

15. The system of claim 14, wherein the first maplet and the second maplet are the same maplet.

16. The system of claim 15, wherein the first maplet and the second maplet are different maplets.

17. The system of claim 13, wherein configuring network data collection and collected data processing comprises configuring probes of the operating system of the corresponding network node to collect network data to support the specified network analysis task.

* * * * *